United States Patent [19]

Hammel et al.

[11] 4,031,450
[45] June 21, 1977

[54] TWO STEP SOLID STATE BATTERY CHARGER

[75] Inventors: Ronald O. Hammel, Denver; Charles N. Kuykendall, Boulder; William A. Fischer, Denver, all of Colo.

[73] Assignee: The Gates Rubber Company, Denver, Colo.

[22] Filed: Mar. 26, 1971

[21] Appl. No.: 128,430

[52] U.S. Cl. .................................. 320/23; 320/35; 320/39; 320/DIG. 2
[51] Int. Cl.$^2$ ........................................ H02J 7/10
[58] Field of Search .................. 320/36, 14, 20, 39, 320/40, 35, 23, DIG. 2

[56] References Cited
UNITED STATES PATENTS

| | | | |
|---|---|---|---|
| 3,278,823 | 10/1966 | Ross ..................................... | 320/39 |
| 3,321,691 | 5/1967 | Walsh .................................. | 320/40 |
| 3,497,791 | 2/1970 | Moore ................................. | 320/39 |
| 3,531,706 | 9/1970 | Millersman .......................... | 320/20 |
| 3,538,415 | 11/1970 | Wilson ............................... | 320/36 X |

Primary Examiner—Robert J. Hickey
Attorney, Agent, or Firm—Curtis H. Castleman, Jr.; Raymond Fink; H. W. Oberg, Jr.

[57] ABSTRACT

Electronic circuitry for charging batteries is designed to charge the cells at a relatively high charging rate through a charging path which includes a semiconductor switching means, e.g. a transistor. Control circuitry is provided including a shunting controlled rectifier which is triggered into conduction when the battery has reached its nearly fully charged condition, thus shunting current away from the battery and preferably latching the transistor into non-conduction. A lower rate, trickle maintenance charge is provided by way of a resistor shunt across the switching means. The effect of temperature on the shunt controlled rectifier gating requirements is used in a positive manner to automatically latch the transistor into non-conduction as the cell approaches its fully charged condition while simultaneously preventing overcharging by tapering the battery voltage to a suitable level.

17 Claims, 4 Drawing Figures

INVENTORS
R.O. HAMMEL
C.N. KUYKENDALL
W.A. FISCHER
BY Curtis H. Castleman Jr.

TWO STEP SOLID STATE BATTERY CHARGER

BACKGROUND OF THE INVENTION

This invention relates to the precise charging of secondary electrochemical cells and particularly to the relative rapid charging of cells without the need for supervision.

It has long been recognized that a desirable battery charger would be one which would bring the battery cells to be charged to a fully charged condition in a relatively short period of time without the need of supervision. A further desirable characteristic would be to enable the user to leave the battery connected to the charging apparatus without fear of damage to the cell even for prolonged periods. While conventional battery chargers have the capability of bringing the voltage of the battery up to a desired level in a relatively short period of time, oftentimes the charger then maintains the cell at this constant voltage level with the result that the cell will eventually be destroyed through overcharging. To compensate for this drawback, the charge voltage level has often been reduced which necessitates much longer charging periods in order to attain the desired capacity.

Some prior art investigators have advantageously employed the switching properties of a silicon controlled rectifier (SCR herein) to sense the battery cell voltage level and shunt the charging current away from the battery when the battery has attained its end of charge voltage. While this type of curcuitry has been generally satisfactory for the purposes to which it has been put, the characteristics of the individual circuits have been such that the shunt SCR does not always fire, or fires relatively late in A-C cycle (in response to the natural reduction in voltage of the cell which reduces the gate signal applied to the SCR). The result is that the charging circuit periodically returns to admitting high rate, quite often damaging, charging pulses to the battery cell. This type of circuitry has not always provided the precision required for many applications.

Pertinent prior art may be found in the United States Patent Office Classification Class 320, Electricity, Battery, and Condenser Charging and Discharging. Examples of the state of the art include U.S. Pats. Nos. 3,159,755; 3,278,823; 3,417,308; 3,436,639; and 3,531,706.

It is principal object of the present invention to provide a battery charging circuit capable of rapidly elevating a battery to its fully charged condition and then automatically terminating charging to prevent cell impairment.

It is another object of the invention to provide a charging circuit which utilizes a shunting circuit including a controlled rectifier in which the controlled rectifier is allowed to increase in temperature and respond to the temperature to provide a precise means for safely terminating charge.

It is still another object to eliminate high power dissipation losses during and after cutback of charging.

It is another object of the invention to provide a two-step charging rate for rapidly bringing the battery to be charged to its nearly full charged condition, followed by application of a predetermined trickle maintenance charge.

It is still a further object of this invention to provide electronic circuitry for a battery charger utilizing a minimum number of components and representing a low cost investment.

These and other objects are met and the disadvantages of the prior art solved by employing the method and construction of the present invention as described herein.

SUMMARY OF THE INVENTION

Briefly described, the battery charging circuitry of the present invention includes a charging circuit comprising a semiconductor switching means, e.g. a transistor, connected to the battery to be charged and supplied preferably from a source of rectified alternating current. The control circuit comprises a shunt leg consisting of a controlled rectifier having a control or gate electrode and a series resistor providing the bias to the control terminal (e.g. base of the transistor) of the aforementioned semiconductor switching means. The gate electrode of the controlled rectifier is connected to a voltage divider, e.g. a potentiometer, in parallel with the battery to be charged. The control electrode trigger voltage level of the controlled rectifier is set by varying the voltage divider to turn on the controlled rectifier and shunt current away from the battery when the voltage of the battery has risen to its preselected end of charge voltage corresponding with the nearly fullcharged state of the battery. The effect of temperature on the controlled rectifier gating requirements is positively utilized to taper the charging current and voltage level of the battery to prevent overcharging yet maintain the battery at a fully charged level. An optional trickle maintenance charge may be provided by shunting the switching means with a properly selected resistor.

The battery charger of the present invention has found particular utility in charging sealed electrochemical secondary cells, such as sealed nickel-cadmium, alkaline-manganese dioxide, nickel-zinc, and lead-acid battery cells. The charger is also useful for charging storage batteries and the like. While the charger of the present invention has all of the above mentioned uses, it is not intended the invention be limited to such specific uses.

BRIEF DESCRIPTION OF THE DRAWINGS

In the drawings, in which like numerals refer to like parts in the several figures.

PREFERRED EMODIMENTS OF THE INVENTION

Figure 1:
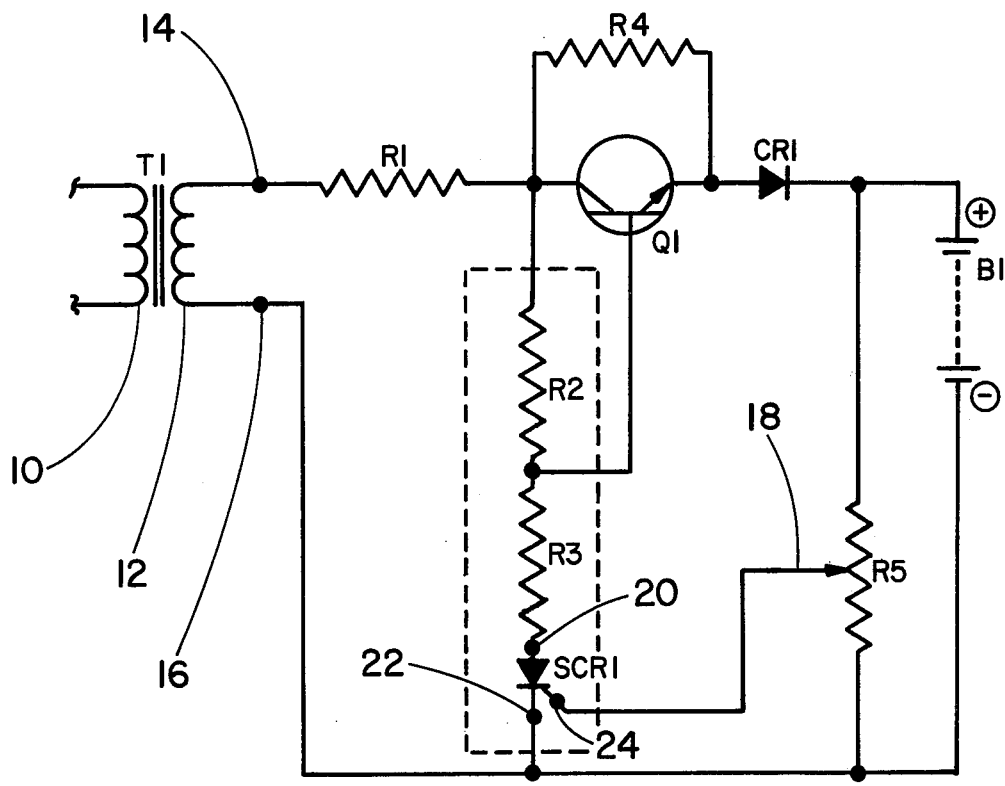
FIG. 1 is a schematic diagram illustrating a preferred embodiment of the charger of the present invention.

Referring to FIG. 1, a battery to be charged which may consist of one or more cells is indicated at Bl. A source of electric power for charging the battery is provided by transformer T1 having a primary winding 10 and a secondary winding 12, the primary being energized from a suitable source such as the customary 115 volt A.C. 60-cycle supply, or the like. An on-off switch and protective fuse (not shown) may be used to safeguard against device failure. The secondary winding 12 provides charging terminals 14 and 16.

Current supplied from the charging terminals is delivered through resistor R1 which, in combination with the transformer impedance and other circuit impedances serves to limit the initial charging current of the charger. Current is supplied to the battery through NPN transistor Q1 in series with diode CR1 which protects the base-emitter junction of Q1 from reverse bias and rectifies the transformer voltage to one-half wave D.C. Base current to the transistor Q1 is provided through biasing resistor R2 which in turn is in series with resistor R3 and which together limit the current to controlled recitifier SCR1 having anode 20, cathode 22 and gate electrode 24. This latter gate electrode is connected through a voltage divider network in parallel with the battery and consisting of a potentiometer having a resistor R5 and an adjustable contact arm 18.

Resistor R4 is connected across the transistor Q1 and functions to limit the low rate charge current, providing a trickle maintenance charge to B1.

As shown by the dotted lines, resistors R2 and R3 exist in thermal contact with SCR1.

Figure 3:
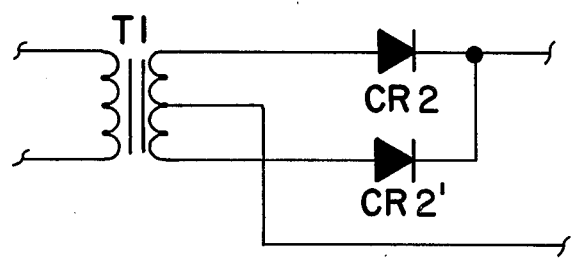
FIG. 3 depicts a means for rectifying the input charging current.

Certain changes may be made in the configuration of FIG. 1 without departing from the scope of the invention. For instance, rather than employing half wave rectification as shown, a full wave rectifier such as the center tapped arrangement shown in FIG. 3 employing diodes CR2 and CR2' may be employed and will provide the advantage of supplying the charger circuitry of FIG. 1 with a 50% reduction of the peak to average current ratio and still maintain the same charging current level. Other specific modifications will be noted hereafter.

The operation of the circuitry of FIG. 1 may be described as follows. Assuming the initial condition of the battery B1 to be less than fully charged, the output voltage of the transformer-rectifier circuit exceeds the voltage across the terminals of the battery and Q1 is biased on (its emitter base junction is forwarded-biased and its collector-base junction is reversed-biased) by R2. A major charging current path is thus provided through Q1 in an amount which is limited by the resistor R1 and by the amount of base current delivered to Q1 by proper selection of R2. The gate trigger voltage level of SCRI is set on the resistor divider R5 to turn on SCR1 only when the battery voltages has risen to its end of charge voltage limit which corresponds with the nearly full charged state (e.g. at least 90%) of the battery.

Thus at the beginning of circuit operation there is no current through R3 and SCR1; the battery continues to charge through transistor Q1 and toward the end of charge its voltage rises, producing a voltage at the gate of SCR1 sufficient to forward bias its gate-cathode junction to make it begin to fire occasionally. The resulting current through R2, R3 and SCR1 generates heat, and owing to the thermal connection between R2, R3 and SCR1, SCR1 is heated further. Because the base current to the transistor Q1 is very small, SCR1 has not been heated appreciably by R2 prior to the time that it has been rendered conductive.

As heating of the controlled rectifier continues and junction temperature increases, its gate trigger voltage level is reduced causing the SCR to turn on more readily with a regenerative effect which ends with the controlled rectifier turning full on for every positive half-cycle. A sizable heating current through the shunt leg consisting of R2, R3, and SCR1 keeps SCR1 on throughout the balance of the charging cycle. This shunt current is limited by R2 and R3. Voltage drop across R2 has now biased the base of transistor Q1 less positive than the emitter, thereby essentially cutting it off. The battery charging current is now determined by R4 which is selected so that only a small trickle maintenance charge current is supplied to the battery. This trickle charge current is selected to be of a value which will maintain the full charge of the battery but not overcharge it.

If R2 and R3 are properly chosen, when the battery has reached its end of charge voltage and SCR1 begins to conduct, as a modification of the invention Q1 will be biased to admit a pre-selected trickle charge without the need of the bypass resistor. As another alternative, in some instances resistor R3 may be omitted and replaced by a short circuit to increase the current flowing in SCR1 to thereby heat it at a faster rate than if R3 were present. It can be thus seen that the shunt leg resistors R2 and R3 can be selected to tailor the charging requirements of the particular battery to be charged. By use of the thermal effect on gating requirements of SCR1, the charging current to the battery may be quickly terminated or gradually reduced to fit the particular needs of the battery, depending upon the extent to which the controlled rectifier is allowed to heat.

As an additional modification, the voltage divider could customarily consist of a simple resistor divider where each resistor is chosen to provide the proper bias across the gate-cathode junction of SCR1. Furthermore, the voltage divider could consist of the potentiometer shown in FIG. 1 in series with an additional resistor connected to the positive of battery B1 to make the cutback adjustment of R5 far less critical.

Figure 4:
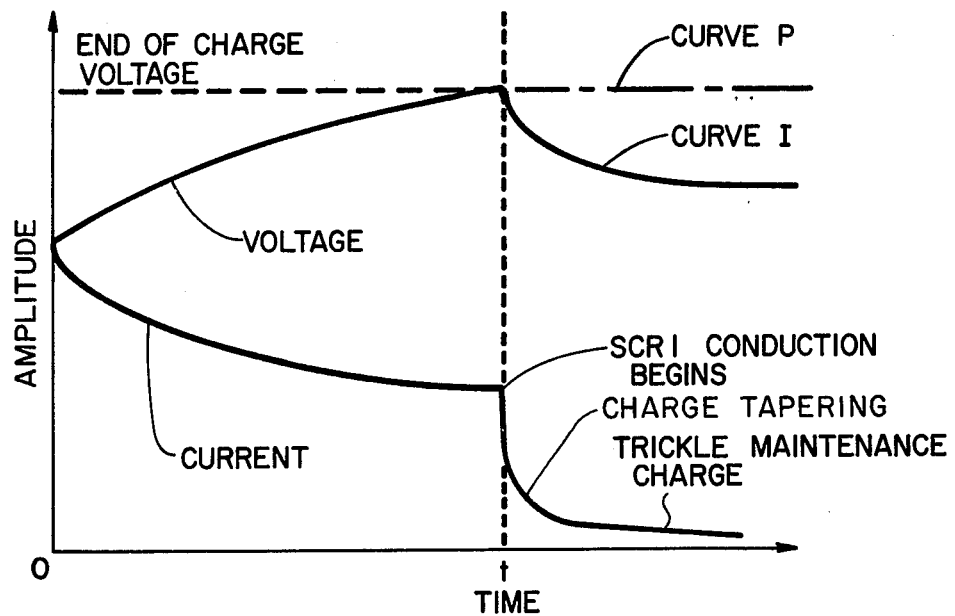
FIG. 4 illustrates in graphic form the charging current applied to and voltage output of the battery charger with respect to time.

Referring to FIG. 4, positive use of temperature increase in SCR1 according to the present invention permits the charger to bring the cell voltage up to its end of charge voltage rapidly, yet carefully cut back the charging current and reduce the average voltage level of the cell (as shown by Curve I) to a safe level to prevent overcharging as SCR1 begins to conduct. Without the use of the thermal effect on gating requirements of the controlled rectifier, SCR1 will never fully turn on for the entire positive one-half cycle and full amplitude charging pulses or spikes will be periodically admitted through transistor Q1 to the battery; the average voltage of the battery will maintain its high level (as represented by Curve P) with the strong possibility of causing damage to the cell.

As has been previously described, temperature utilization in SCR1 can be effected by placing resistor R2 and R3, or either one of them individual, in thermal relationship with the controlled rectifier. Positive utilization of temperature can also be accomplished by selfheating in the controlled rectifier. This latter method can be carried out either by employing no heat sink or other external means of dissipating in the controlled rectifier, or by using a relatively small heat sink to allow a suitable amount of heat dissipation, yet prevent destruction of the device. Any suitable combination of self-heating and external heat linking may also be employed. An important criteria is that the heating means bears a a relationship to or is stimulated by the battery charge level. As another alternative, SCR1 can be thermally linked to the battery B1 to sense and respond to temperature increase in the battery as it approaches its end of charge voltage.

Figure 2:
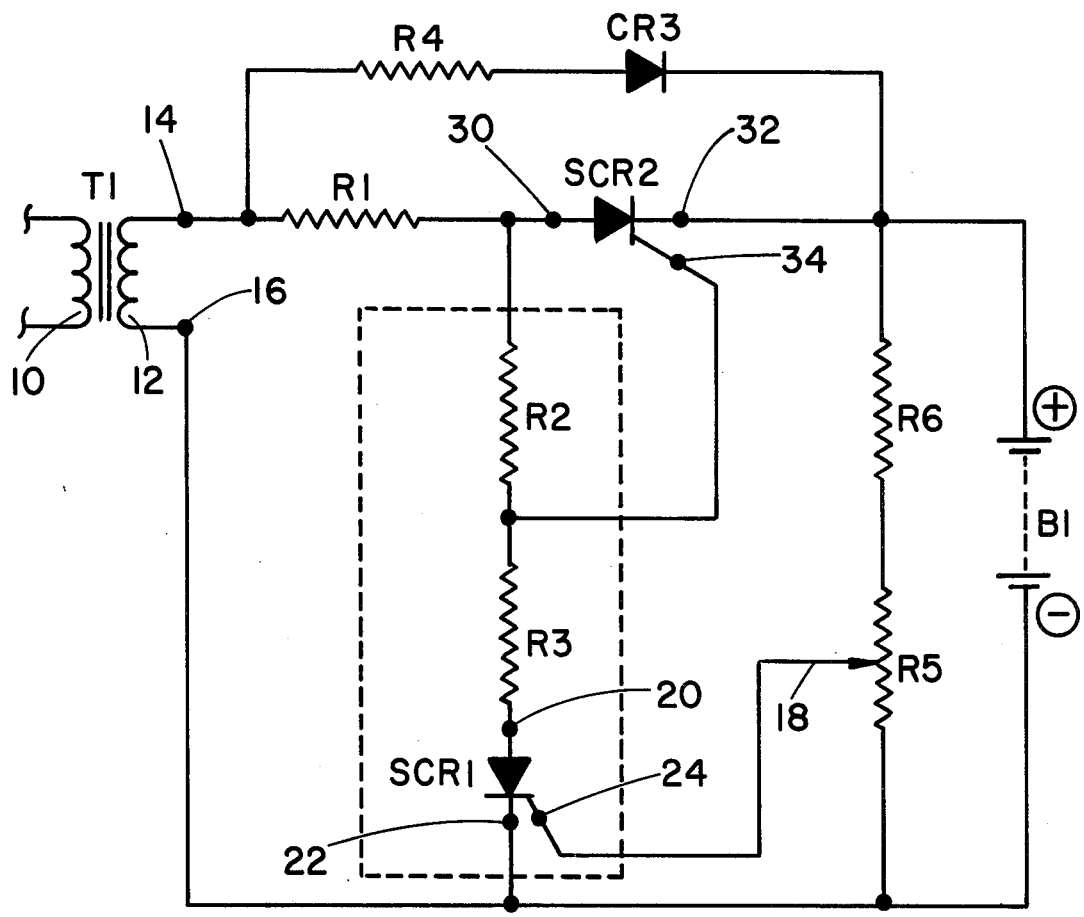
FIG. 2 shows one alternative embodiment of the charging circuitry of the present invention.

An additional alternative embodiment is depicted in FIG. 2 in which silicon controlled rectifier SCR2 having anode 30, cathode 32 and control (or gate) electrode 34 is used as the semiconductor switching means in place of the transistor employed in FIG. 1. The circuit operates basically in the same manner as the circuit in FIG. 1, with SCR1 shunting current away from the battery as the battery reaches its end of charge voltage and a corresponding gate trigger voltage is thereby applied to SCR1 to render it conductive. A trickle maintenance charge is thereafter provided by the proper selection of resistor R4 in series with the unidirectional current carrying means diode CR3. R2 and R3 are chosen to normally render SCR2 conductive, yet to cause gate 34 to be brought more negative than cathode 32 of SCR2 (plus the gate-cathode potential) when SCR1 is triggered on. In this mode SCR2 is non-conducting while SCR1 is conducting. It should be understood that other semiconductor switching means (e.g. a silicon controlled switch) could be utilized by simple modification. Use of the semiconductor switching means according to the present invention is advantageous because it allows one to employ low power resistors.

Another feature of the charger of the present invention is charging level with respect to the ambient temperature. Specifically, if the ambient temperature is relatively high, the charger will charge the battery to a lower voltage than if normal temperatures were encountered. Likewise, if the ambient temperature is low, the battery will be charged to a higher voltage than at normal temperatures. This feature is advantageous since it is typical of electrochemical cells to experience an undesirable exponential increase in gaseous evolution (e.g. $H_2$ and/or $O_2$) with rising temperature and/or rising voltage.

As an illustrative working example of the invention, the circuitry of FIG. 1 having the below enumerated elements is used to charge three series connected 2-½ ampere-hour sealed lead-acid D size cells. R3 is shorted and R6 represents a resistor in series with R5 and conected to the positive of B1:

$R_2$—100 ohms
$R_1$—12 ohms
$R_4$—560 ohms
$R_5$—250 ohms
$R_6$—2K ohms
SCR1—GEC107F1
CR1—1N4001
$Q1$—Fairchild 2N3567
$T1$—10 volt, 500 m. amp.

It should be understood that the invention is capable of a variety of modifications and variations which will be made apparent to those skilled in the art by a reading of the specification which are to be included within the scope of the claims appended hereto.

What is claimed is:

1. Charging means for delivering current to a battery comprising:
   a. a power source connected to first and second charging terminals;
   b. a charging path including a semiconductor switching means connected between said first charging terminal and one side of said battery, said switching means having a control terminal;
   c. a shunt path between said first and second charging terminals including a resistor in series with a controlled rectifier having a gate electrode, a cathode connected to said second charging terminal, and an anode connected to said resistor and forming a juncture therebetween, said juncture connected to said control terminal of said switching means;
   d. a voltage divider connected across said battery, said gate electrode connected to said voltage divider at a pre-selected dividing point;
   e. said second charging terminal connected to the other side of said battery;
   f. whereupon charging, current is supplied to the battery through the charging path, and when the battery reaches its pre-selected end of the charge voltage, sufficient potential is impressed across the gate-cathode junction to the controlled rectifier to render it conductive and thereby shunt current away from the battery;
   g. said controlled rectifier provided with means other than or in addition to self-heating for increasing its temperature during conduction to lower the gate-cathode potential required to render the controlled rectifier conductive, and thereby latching said switching means into non-conduction and reducing the battery voltage to a safe limit to prevent overcharging.

2. The charging means of claim 1 wherein the signal supplied by the power source is rectified to supply direct current.

3. The charging means of claim 1 wherein a current limiting resistor is connected between said first charging terminal and said switching means.

4. The charging means of claim 1 wherein a resistor is connected between the anode of said controlled rectifier and said juncture.

5. The charging means of claim 1 wherein a resistor is connected in parallel across said switching means to provide a trickle charge to the battery after said switching means has been latched into non-conduction.

6. The charging means of claim 1 wherein a diode is connected between said switching means and one side of said battery in said charging path.

7. The charging means of claim 6 wherein a resistor is connected between the voltage divider and one side of said battery.

8. The charging means of claim 1 wherein said controlled rectifier is in thermal conductive relationship with said series connected resistor.

9. The charging means of claim 4 wherein said controlled rectifier exists in thermal conductive relationship with both of said series connected resistors.

10. The charging means of claim 1 wherein the controlled rectifier exists in thermal conductive relationship with the battery to be charged.

11. The charging means of claim 1 wherein said switching means consists of an NPN transistor whose base corresponds to said control terminal.

12. The charging means of claim 1 wherein said switching means is a silicon controlled rectifier.

13. The charging means of claim 1 wherein said controlled rectifier is a silicon controlled rectifier.

14. The charging means of claim 4 wherein the resistor connected between the anode of said controlled rectifier and said juncture is in thermal conductive relationship with said controlled rectifier.

15. In a method of charging a battery of one or more electrochemical cells utilizing circuitry comprising a power source provided with input terminals, a semiconductor switching means connected between the power source and battery, a shunt path connected across said power source and including a resistive element and controlled rectifier having a control terminal, and a voltage divider connected across said battery and having a juncture point connected to said control terminal, the improvement comprising:

substantially freely heating said controlled rectifier below its destruction point, commencing heating only when the battery has attained a nearly fully charged state corresponding to a given end of charge voltage exhibited by the battery, said heating of the controlled rectifier being provided by placing said resistive element in thermal conductive relationship with said controlled rectifier;

reducing the battery voltage below said end of charge voltage; and thereafter continuously maintaining the battery voltage level below said end of charge voltage to prevent overcharging the battery while simultaneously tapering charging current to safety bring the battery to its fully charged state.

16. In a method of charging a battery of one or more electrochemical cells utilizing circuitry comprising a power source provided with input terminals, a semiconductor switching means connected between the power source and battery, a shunt path connected across said power source and including first and second resistive elements and a controlled rectifier having a control terminal, said first and second resistive element having a juncture therebetween connected to a control terminal of said semiconductor switching means, said second resistive element being connected within the shunt path and between said controlled rectifier and the first resistive element, and a voltage divider connected across said battery and having a juncture point connected to said control terminal of the controlled rectifier, the improvement comprising:

substantially freely heating said controlled rectifier below its destruction point, commencing heating only when the battery has attained a nearly fully charged state corresponding to a given end of charge voltage exhibited by the battery, said heating of the controlled rectifier effected by placing said second resistive element in thermal conductive relationship with said controlled rectifier;

reducing the battery voltage below said end of charge voltage; and thereafter continuously maintaining the battery voltage level below said end of charge voltage to prevent overcharging the battery while simultaneously tapering charging current to safely bring the battery to its fully charged state.

17. In a method of charging a battery of one or more electrochemical cells utilizing circuitry comprising a power source provided with input terminals, a semiconductor switching means connected between the power source and battery, a shunt path connected across said power source and including a resistive element and controlled rectifier having a control terminal, and a voltage divider connected across said battery and having a juncture point connected to said control terminal, the improvement comprising:

substantially freely heating said controlled rectifier below its destruction point, commencing heating only when the battery has attained a nearly fully charged state corresponding to a given end of charge voltage exhibited by the battery, said heating of the controlled rectifier being effected by placing said battery in thermal conductive relationship with said controlled rectifier;

reducing the battery voltage below said end of charge voltage; and thereafter continuously maintaining the battery voltage level below said end of charge voltage to prevent overcharging the battery while simultaneously tapering charging current to safely bring the battery to its fully charged state.

* * * * *